E. A. HEINLEIN AND R. A. STOLLE.
SAFETY DEVICE FOR OILING SYSTEMS OF MOTORS.
APPLICATION FILED JULY 23, 1919.
1,378,349.
Patented May 17, 1921.
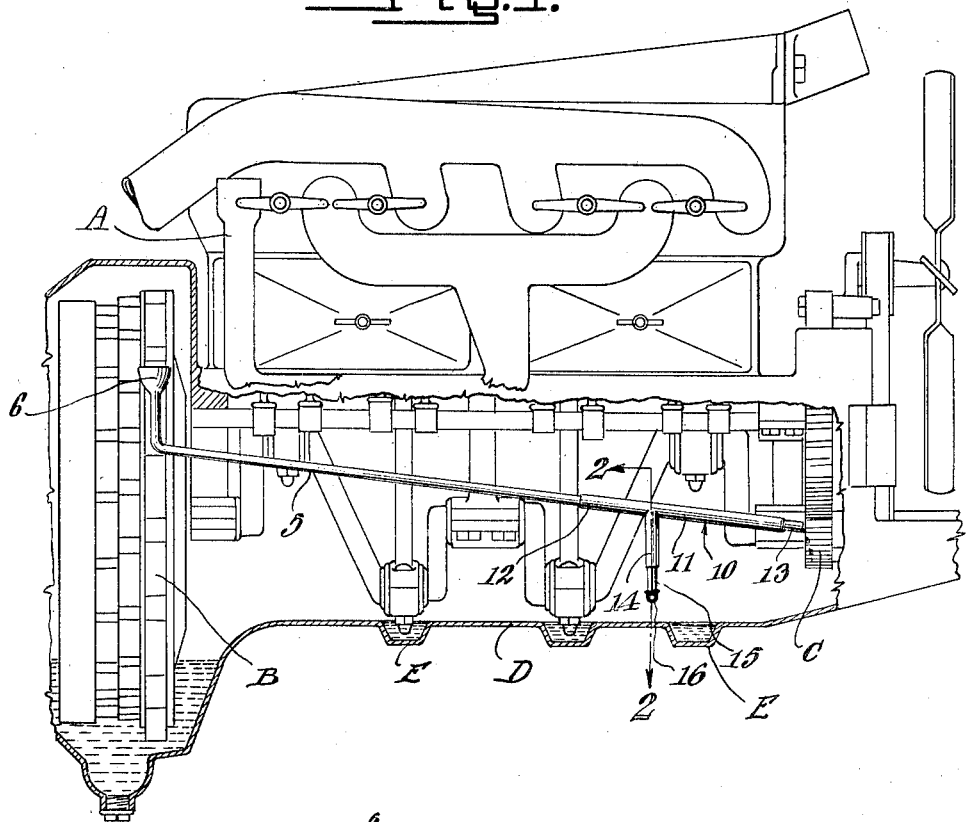
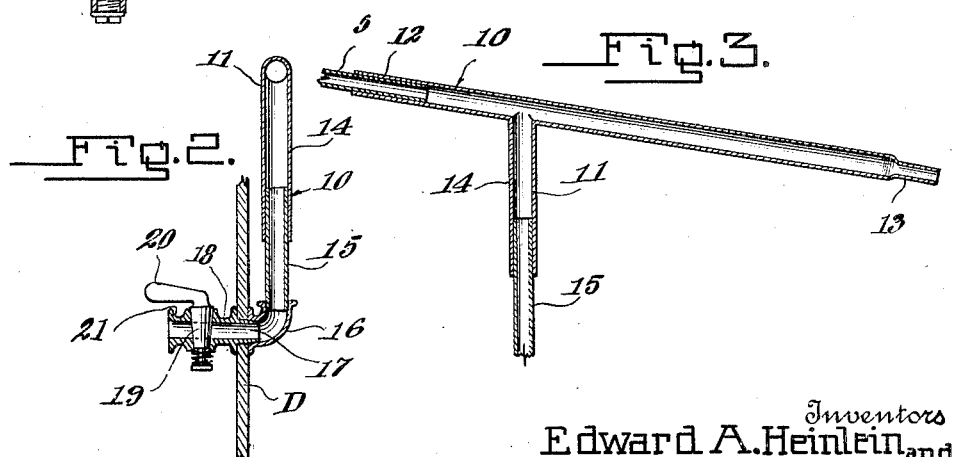
Inventors
Edward A. Heinlein and
Raymond A. Stolle

UNITED STATES PATENT OFFICE.

EDWARD A. HEINLEIN AND RAYMOND A. STOLLE, OF LOS ANGELES, CALIFORNIA.

SAFETY DEVICE FOR OILING SYSTEMS OF MOTORS.

1,378,349. Specification of Letters Patent. Patented May 17, 1921.

Application filed July 23, 1919. Serial No. 312,862.

*To all whom it may concern:*

Be it known that we, EDWARD A. HEINLEIN and RAYMOND A. STOLLE, citizens of the United States, residing at Los Angeles, in the county of Los Angeles and State of California, have invented certain new and useful Improvements in Safety Devices for Oiling Systems of Motors, of which the following is a specification.

This invention relates to an attachment for "Ford" motors, and an object of the invention is to provide an attachment for use in the oil feed system of a Ford motor whereby the system may be easily and conveniently tested to determine if it is properly operating, and which attachment further facilitates the cleaning of the pipe which carries the oil from the flywheel compartment to the timing gears and thence to usual troughs of the bottom plate, by blowing air under pressure therethrough to dislodge any foreign substance from the said pipe.

Other objects of the invention will appear in the following detailed description taken in connection with the accompanying drawing forming a part of this specification and in which drawing:

Figure 1 is a view partially in side elevation and partially in section of a "Ford" motor showing the improved attachment for the oil system thereof applied thereto.

Fig. 2 is a fragmentary section through the attachment taken on the line 2—2 of Fig. 1, and Fig. 3 is a longitudinal section through the attachment.

Referring more particularly to the drawings, wherein like characters indicate like and corresponding parts throughout the several views, 5 indicates the pipe of the oiling or lubricating system of the motor A which has the cup 6 upon the receiving end thereof to receive oil from the flywheel compartment B of the motor and deliver it to the timing gears C from which it flows to the troughs E in the usual manner. In the present construction of this mechanism of a "Ford" motor it is comparatively difficult to determine if the lubricating oil is properly flowing through the pipe 5, and to permit it to be readily determined, whether the oil is properly flowing through the pipe or not, the attachment 10 is provided. This attachment 10 comprises a substantially T-shaped pipe 11, the end 12 of which telescopically receives the lower end of the pipe 5, which pipe must be cut off, to permit the attachment thereto of the safety device or attachment 10. The end 13 of the head portion of the pipe 11 is reduced in diameter so that the bore thereof is practically of the same diameter as the pipe 5 to maintain the proper flow of the lubricating oil upon the timing gears C and permit entry of the end 13 into the hole of the front crank case compartment, housing the timing gears, and which, in the ordinary construction of the "Ford" engine accommodates a continuous length of pipe from cup 6 to the timing gears. The stem 14 of the pipe 11 telescopically receives therein the upper end of a pipe 15, which has its lower end connected to an elbow 16. The elbow 16 is attached in any suitable manner to the housing D of the motor structure A and is connected to the nipple 17 formed upon the valve casing 18. This valve casing 18 is positioned exteriorly of the housing D and has a cone valve 19 seated therein, which may be manually rotated through the medium of the handle 20 to permit the flow of oil outwardly through the casing 18 for determining if the lubricating oil is properly flowing through the pipes. The telescopic connection between the stem 14 and pipe 15 permits of adjustment of the position of the valve casing 18 to suit the desires of the person installing the attachment.

The outer end of the casing 18 is provided with an annular channel 21 adapted to receive therein the free end of the hose of an ordinary tire pump or analogous air compressing pump to permit the forcing of air under pressure through the ways 15 of the attachment 10 and through the pipe 5 for dislodging any sediment or other foreign substance which might have accumulated within the pipe 5 or attachment 10 and consequently hinder the proper flow of the lubricating oil therethrough.

From the foregoing description taken in connection with the drawings it is readily apparent that an attachment for the lubricating systems of Ford motors has been provided which may be quickly and easily installed upon any existing motors of this type, and by means of which the proper functioning of the lubricating system, for lubricating the timing gears and other parts of the motor may be easily proven or tested, and by which the said system may be easily and thoroughly cleaned, in case of improper feeding of oil therethrough.

Changes in details may be made without departing from the spirit of this invention, but;

We claim:

1. In combination with a motor including a casing and parts within said casing requiring lubrication, of a pipe wholly within said casing for flow of oil from one portion of the casing to another, and conveying means providing a way in communication with said pipe and the exterior of said casing for gravity flow of oil therefrom, and a valve in said conveying means.

2. The combination with the timing gears lubricating oil carrying pipe of a "Ford" motor, of a substantially T-shaped pipe connected to said lubricating oil feed pipe, and a valve connected to said T-shaped pipe and positioned exteriorly of the motor.

3. The combination with the lubricating oil feed pipe for the timing gears of "Ford" motor of a substantially T-shaped pipe telescopically receiving one end of said lubricating oil feed pipe, the pipe telescopically connected to one branch of said T-shaped pipe, and a valve connected to said last named pipe and extending exteriorly of the motor.

4. The combination with the lubricating oil feed pipe for the timing gears of "Ford" motors, of a substantially T-shaped pipe telescopically receiving one end of said lubricating oil feed pipe, a pipe telescopically connected to one branch of said T-shaped pipe, and a valve connected to said last named pipe and extending exteriorly of the motor, the end of said T-shaped pipe alining with the end which telescopically receives the feed pipe being reduced in diameter.

5. The combination with the lubricating oil feed pipe for the timing gears of "Ford" motors, of a substantially T-shaped pipe telescopically receiving one end of said lubricating oil feed pipe, a pipe telescopically connected to one branch of said T-shaped pipe, and a valve connected to said last named pipe and extending exteriorly of the motor, the end of said T-shaped pipe alining with the end which telescopically receives the feed pipe being reduced in diameter, said valve comprising a casing having an annular groove about the outer edge thereof adapted for connection with the supply hose of an air compressing pump.

6. As a new article of manufacture, a safety appliance for attachment to an internal combustion engine lubricating oil feed pipe comprising a substantially T-shaped pipe, a second pipe telescopically connected to the free end of the stem of said T-shaped pipe, and a valve connected to said last named pipe.

EDWARD A. HEINLEIN.
RAYMOND A. STOLLE.